US007319641B2

(12) United States Patent
Goudie et al.

(10) Patent No.: US 7,319,641 B2
(45) Date of Patent: Jan. 15, 2008

(54) SIGNAL PROCESSING DEVICE FOR ACOUSTIC TRANSDUCER ARRAY

(75) Inventors: Angus Gavin Goudie, Cambridge (GB); Paul Thomas Troughton, Cambridge (GB); Anthony Hooley, Cambridge (GB)

(73) Assignee: 1 . . . Limited, Cambridge (GB)

( * ) Notice: Subject to any disclaimer, the term of this patent is extended or adjusted under 35 U.S.C. 154(b) by 387 days.

(21) Appl. No.: 10/492,138

(22) PCT Filed: Oct. 10, 2002

(86) PCT No.: PCT/GB02/04605

§ 371 (c)(1), (2), (4) Date: Oct. 21, 2004

(87) PCT Pub. No.: WO03/034780

PCT Pub. Date: Apr. 24, 2003

(65) Prior Publication Data

US 2005/0041530 A1 Feb. 24, 2005

(30) Foreign Application Priority Data

Oct. 11, 2001 (GB) ................................ 0124352.6

(51) Int. Cl.
*H04B 1/02* (2006.01)
*H04R 5/00* (2006.01)

(52) U.S. Cl. ........................................ 367/138; 381/18

(58) Field of Classification Search ................ 367/138, 367/905; 381/17, 18, 77, 81, 85
See application file for complete search history.

(56) References Cited

U.S. PATENT DOCUMENTS

| | | | | |
|---|---|---|---|---|
| 3,992,586 | A | | 11/1976 | Jaffe |
| 3,996,561 | A | | 12/1976 | Kowal et al. |
| 4,042,778 | A | | 8/1977 | Clinton et al. |
| 4,190,739 | A | | 2/1980 | Torffield |
| 4,305,296 | A | | 12/1981 | Green et al. |
| 4,330,691 | A | | 5/1982 | Gordon |
| 4,332,018 | A | * | 5/1982 | Sternberg et al. ........... 367/905 |
| 4,388,493 | A | | 6/1983 | Maisel |
| 4,472,834 | A | | 9/1984 | Yamamuro et al. |

(Continued)

FOREIGN PATENT DOCUMENTS

DE 966834 C 8/1957

(Continued)

OTHER PUBLICATIONS

Komiyama: "Distance Control of Sound Images for 3D TV"; NHK Laboratories Notes, NHK Technical Research Laboratories; Aug. 1, 1992; pp. 1-11; No. 406; Tokyo.

"Waveform Inversion for Individual Ambient Sound Control"; IBM Technical Disclosure Bulletin; IBM Corporation; Sep. 1993; pp. 537-540: vol. 36, No. 9A; New York.

(Continued)

*Primary Examiner*—Daniel Pihulic
(74) *Attorney, Agent, or Firm*—Elman Technology Law, P.C.; Gerry J. Elman

(57) ABSTRACT

The invention provides transducer arrays which are capable of outputting sound beams having a relatively constant width, and with minimal sidelobes, across a range of frequencies. This is achieved by utilising one or more digital signal modifiers within the signal path between the input sound signal and the array of transducers. Variable window functions are also disclosed.

28 Claims, 15 Drawing Sheets

U.S. PATENT DOCUMENTS

| | | | | |
|---|---|---|---|---|
| 4,515,997 | A | 5/1985 | Stinger, Jr. | |
| 4,518,889 | A * | 5/1985 | 'T Hoen | 367/153 |
| 4,653,505 | A | 3/1987 | Iinuma | |
| 4,769,848 | A | 9/1988 | Eberbach | |
| 4,773,096 | A | 9/1988 | Kirn | |
| 4,972,381 | A | 11/1990 | Mitchell et al. | |
| 4,980,871 | A | 12/1990 | Sieber et al. | |
| 4,984,273 | A | 1/1991 | Aylward et al. | |
| 5,051,799 | A | 9/1991 | Paul et al. | |
| 5,131,051 | A | 7/1992 | Kishinaga et al. | |
| 5,166,905 | A | 11/1992 | Currie | |
| 5,227,591 | A | 7/1993 | Tarkkonen | |
| 5,233,664 | A | 8/1993 | Yanagawa et al. | |
| 5,287,531 | A | 2/1994 | Rogers, Jr. et al. | |
| 5,313,172 | A | 5/1994 | Vagher | |
| 5,313,300 | A | 5/1994 | Rabile | |
| 5,438,624 | A | 8/1995 | Lewiner et al. | |
| 5,488,956 | A * | 2/1996 | Bartelt et al. | 600/459 |
| 5,517,200 | A | 5/1996 | McAdam et al. | |
| 5,745,435 | A | 4/1998 | Fage et al. | |
| 5,751,821 | A | 5/1998 | Smith | |
| 5,763,785 | A | 6/1998 | Chiang | |
| 5,832,097 | A | 11/1998 | Armstrong et al. | |
| 5,834,647 | A | 11/1998 | Gaudriot et al. | |
| 5,841,394 | A | 11/1998 | Sterns et al. | |
| 5,859,915 | A | 1/1999 | Norris | |
| 5,867,123 | A | 2/1999 | Geyh et al. | |
| 5,885,129 | A | 3/1999 | Norris | |
| 5,963,432 | A | 10/1999 | Crowley | |
| 6,005,642 | A | 12/1999 | Meisner et al. | |
| 6,084,974 | A | 7/2000 | Niimi | |
| 6,122,223 | A | 9/2000 | Hossack | |
| 6,128,395 | A | 10/2000 | De Vries et al. | |
| 6,154,553 | A | 11/2000 | Taylor | |
| 6,169,806 | B1 | 1/2001 | Kimura et al. | |
| 6,243,476 | B1 | 6/2001 | Gardner | |
| 6,294,905 | B1 | 9/2001 | Schwartz | |
| 6,373,955 | B1 | 4/2002 | Hooley | |
| 6,967,541 | B2 | 11/2005 | Hooley | |
| 7,092,541 | B1 | 8/2006 | Eberbach | |
| 2002/0126854 | A1 | 9/2002 | Norris et al. | |
| 2002/0131608 | A1 | 9/2002 | Lobb et al. | |
| 2002/0159336 | A1 | 10/2002 | Brown et al. | |
| 2003/0091203 | A1 | 5/2003 | Croft, III et al. | |
| 2004/0151325 | A1 | 8/2004 | Hooley et al. | |
| 2005/0041530 | A1 * | 2/2005 | Goudie et al. | 367/138 |
| 2005/0089182 | A1 | 4/2005 | Troughton et al. | |

FOREIGN PATENT DOCUMENTS

| | | | | |
|---|---|---|---|---|
| DE | 31 42 462 | A1 | | 5/1982 |
| DE | 40 33 068 | A1 | | 4/1991 |
| DE | 4428500 | A | | 3/1995 |
| DE | 43 43 807 | A1 | | 6/1995 |
| EP | 0 025 118 | A1 | | 3/1981 |
| EP | 0 323 110 | A2 | | 7/1989 |
| EP | 0 351 055 | A1 | | 1/1990 |
| EP | 0 492 015 | A1 | | 7/1992 |
| EP | 0 591 899 | A1 | | 4/1994 |
| EP | 0 642 032 | A2 | | 3/1995 |
| EP | 1026663 | A | | 8/2000 |
| EP | 1 061 769 | A2 | | 12/2000 |
| EP | 1 122 973 | A2 | | 8/2001 |
| EP | 1199907 | A | | 4/2002 |
| ES | 2 116 929 | | | 7/1998 |
| FR | 2 628 335 | | | 9/1989 |
| GB | 1 571 714 | | | 7/1980 |
| GB | 1 603 201 | | | 11/1981 |
| GB | 2 209 229 | A | | 5/1989 |
| GB | 2 243 040 | A | | 10/1991 |
| GB | 2 259 364 | A | | 3/1993 |
| GB | 2 259 426 | A | | 3/1993 |
| GB | 2 273 848 | A | | 6/1994 |
| GB | 2 277 152 | A | | 10/1994 |
| GB | 2 290 380 | A | | 12/1995 |
| GB | 2 320 351 | A | | 6/1998 |
| GB | 2 320 351 | B | | 6/1998 |
| GB | 2 326 559 | A | | 12/1998 |
| GB | 2 332 052 | A | | 6/1999 |
| GB | 2 340 351 | A | | 2/2000 |
| GB | 2 345 967 | A | | 7/2000 |
| GB | 2 358 117 | A | | 7/2001 |
| JP | 59-186498 | | | 10/1984 |
| JP | 61-057198 | | | 3/1986 |
| JP | 61-253996 | | | 11/1986 |
| JP | 62-076958 | | | 4/1987 |
| JP | 63-009300 | | | 1/1988 |
| JP | 63-014588 | | | 1/1988 |
| JP | 63-234699 | | | 9/1988 |
| JP | 63-269699 | | | 11/1988 |
| JP | 63-300699 | | | 12/1988 |
| JP | 02-013097 | | | 7/1990 |
| JP | 02-239798 | | | 9/1990 |
| JP | 03-159400 | | | 7/1991 |
| JP | 03-159500 | | | 7/1991 |
| JP | 04-127700 | | | 4/1992 |
| JP | 04-313996 | | | 11/1992 |
| JP | 05-041897 | | | 2/1993 |
| JP | 05-091596 | | | 4/1993 |
| JP | 05-199583 | | | 8/1993 |
| JP | 05-199598 | | | 8/1993 |
| JP | 05-344584 | | | 12/1993 |
| JP | 06-062488 | | | 3/1994 |
| JP | 06-178379 | | | 6/1994 |
| JP | 06-205496 | | | 7/1994 |
| JP | 06-225379 | | | 8/1994 |
| JP | 06-318087 | | | 11/1994 |
| JP | 06-334459 | | | 12/1994 |
| JP | 07-007788 | | | 1/1995 |
| JP | 07-154893 | | | 6/1995 |
| JP | 07-203581 | | | 8/1995 |
| JP | 11-027604 | A | | 1/1999 |
| JP | 11-030525 | A | | 2/1999 |
| JP | 11-046400 | | | 2/1999 |
| JP | 2000-295686 | | | 10/2000 |
| JP | 2000-295697 | | | 10/2000 |
| JP | 2001-069591 | | | 3/2001 |
| JP | 2001-095082 | | | 4/2001 |
| SU | 1678327 | | | 9/1991 |
| WO | WO 96/14723 | | | 5/1996 |
| WO | WO 96/31086 | | | 10/1996 |
| WO | WO 98/58522 | | | 12/1998 |
| WO | WO 99/00780 | | | 1/1999 |
| WO | WO 02/41664 | A2 | | 5/2002 |
| WO | WO 2004075601 | | * | 9/2004 |

OTHER PUBLICATIONS

Troughton; "Convenient Multi-Channel Sound in the Home"; 17th Annual Engineering Society UK Conference, 2002; pp. 102-105.

Johan Van Der Werff, "Design and implemantation of a sound column with exceptional properties", preprint of 96th AES Convention, Amsterdam, No. 3835, XP007901141, Feb. 26, 1994.

* cited by examiner

| | | | | | | |
|---|---|---|---|---|---|---|
| 34 | 30 | 26 | 22 | 24 | 28 | 32 |
| 20 | 16 | 12 | 8 | 10 | 14 | 18 |
| 7 | 5 | 3 | 1 | 2 | 4 | 6 |
| 21 | 17 | 13 | 9 | 11 | 15 | 19 |
| 35 | 31 | 27 | 23 | 25 | 29 | 33 |

FIG. 8A

SIGNAL PROCESSING DEVICE FOR ACOUSTIC TRANSDUCER ARRAY

FIELD OF THE INVENTION

This invention relates to steerable antennae and arrays of transducers, and concerns in particular arrays of electro-acoustic transducers.

BACKGROUND OF THE INVENTION

Steerable or phased array antennae are well known in the art in both the electromagnetic and the ultrasonic acoustic fields. They are less well known in the sonic (audible) acoustic area.

The commonly-owned published International Patent application No WO 01/23104 describes sonic steerable or phased array antennae and their use to achieve a variety of effects. The application describes a method and apparatus for taking an input signal, replicating it a number of times and modifying each of the replicas before routing them to respective output transducers such that a desired sound field is created. This sound field may comprise a directed beam, focussed beam or a simulated origin.

Control of direction and beamwidth, i.e. the steerability, of a beam is required to generate and steer broadband acoustic signals, such as multi-channel audio signals. These parameters depend on the frequency or range of frequencies of the emitted signal. In addition they depend on the spatial arrangement of the emitting sources. The spatial arrangement in turn is subject to technical constraints arising from the technical properties of the transducers employed and costs. Thus, the design of a functional and economically viable source of acoustic energy capable of projecting sound into predetermined directions, in short herein referred to as digital loudspeaker system or DLS, is a complex task.

In WO 01/23104 the direction of a beam is controlled by delaying the output of each transducer across the array. Appropriate delays, which are frequency dependent, lead to a constructive interference at a predetermined location of all the signals as emitted from the transducers of the array.

On the other hand, the beamwidth—whether measured as the angular distance between two minima or by any other known definition—is in the simplest case a function of direction of the beam, its frequency and the emission area or width of the array of sources from which the beam emanates. For previously-described arrays, the beam becomes narrower with increasing frequency. With broadband signals, spanning a broad range of frequencies, potentially many octaves in case of audio signals, this makes it difficult to generate and steer a beam at the lowest frequency components of the signal. One way to overcome this problem is by extending the lateral dimensions of the array of the antennae. However, such larger array narrows the beam at high frequencies. This effect could be disadvantageous in practical applications such as, for example, the projection of sound.

It is therefore an object of the invention to improve the ability of an array of acoustic transducers to emit and steer beams of broadband sonic signal while minimizing mechanical and electronic components required for its implementation.

It is another object of the invention to obtain an array of broadband transducers that emits broadband wave signal with sufficient directivity at low frequency and sufficient beamwidth at high frequencies.

It is a further object of the invention to obtain an array of broadband transducers with improved steerabilty of sound beams having different travel paths before reaching a listener.

SUMMARY OF THE INVENTION

In view of the above objects, the present invention provides a method and apparatus as claimed in the independent claims.

According to a first aspect of the invention, there is provided an array of electro-acoustic transducers capable of steering one or more beams of signal. The signal, being preferably an audio signal, consists of components at many different frequencies simultaneously present in the signal. By using appropriately configured digital signal modifiers, such as digital filters, that adjust the output response array for each of these different components a non-zero output can be limited to subarrays of the array. By broadening the borders of subarray with decreasing frequency of the signal components, a constant beamwidth can be achieved over a whole range of frequencies.

In a variant of this aspect of the invention the edge of the effective area is smoothed by spreading the reduction from full amplitude or gain to cut-off or zero output over a zone that includes at least one transducer operating at a gain level between those two values. The smoothing is intended to reduce the amount of energy emitted as sidelobes to the main beam or beams.

A particularly convenient way of implementing the digital signal modifiers is as digital finite impulse response filters programmed to emulate a window function. The window function widens the area of non-zero emission with decreasing frequency, thus maintaining a constant beamwidth of the signal over a large frequency range. Many different window functions can be used within the scope of this aspect of the invention.

It is a second aspect of the invention to introduce a physical arrangement of transducers that minimizes the number of transducers necessary to generate steerable beams of sonic signals. It was found that by varying the spacing between adjacent transducers gradually or step-wise towards the outer area of the array, the number of transducers could be significantly reduced in comparison with an array of equal width but regular spacing. Alternatively, the size of the transducers may be varied.

By considering the limitations on transducer spacing as imposed by the first aspect of the invention, arrays of minimal numbers of transducers can be designed, yet satisfying the need to generate broadband beams of near-constant beamwidth. All of the above aspects are applicable to one- and two-dimensional flat or curved arrays of transducers.

These and other aspects of inventions will be apparent from the following detailed description of non-limitative examples making reference to the following drawings.

BRIEF DESCRIPTION OF THE DRAWINGS

In the drawings:

FIG. 8A illustrates a possible path pattern according to which transducers may be positioned within an array;

DETAILED DESCRIPTION

Firstly there is described a known arrangement of transducers capable of steering a beam of sonic signal into one or more predetermined directions, also referred to as DLS (Digital Loudspeaker System).

Figure 1:
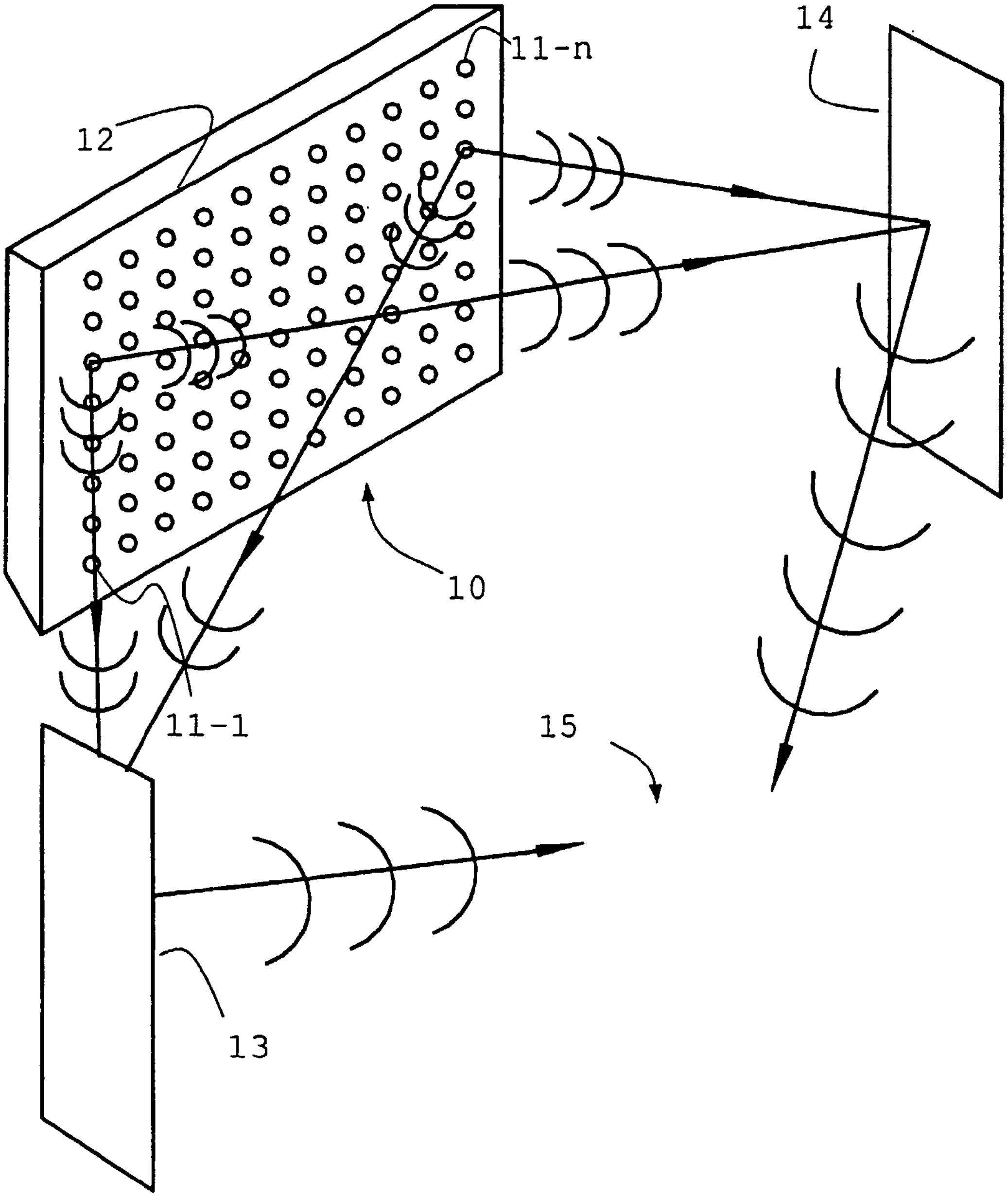
FIG. 1(prior art)
FIG. 1 illustrates an example of a multi-transducer source as described in the International patent application WO-0123104.

The basic arrangement of FIG. 1 shows an array 10 comprising a plurality of spatially-distributed electroacoustic transducers 11-1 to 11-n mounted on a common chassis 12 and arranged in an essentially two-dimensional array. The transducers 11 are each ultimately connected to the same digital signal input. This input is modified and distributed to feed the transducers. Beamsteering is accomplished by adding delays or phase shifts to the signal to ensure a constructive interference of the signals stemming from the individual transducers at pre-determined locations 13, 14. For the purpose of the present example, these location are spots on the side or rear wall of a room giving sufficient reflection to redirect the sound back to a listener 15 in the room. Basic geometric calculations show that the delay is a function of the relative positions of the transducers of the array and the direction θ of the locations 13, 14 relative to the transducers 11-1 to 11-n. Whilst determining the necessary delay or phase shifts is a complex task in itself, the present invention seeks to improve certain aspects that can be treated independently of the basic beamsteering process. For further details of the delay or phase shift aspects of the beamsteering, reference is made for example to the published International patent application WO-0123104, fully incorporated herein.

Whereas the calculation of delay and phase shifts is a known mathematical problem, the electric and electronic circuitry necessary to modify the signal such as to feed appropriately delayed replicas of the signal to each transducer of the array can vary widely and is of course subject to technological advances in the field of signal processing. The components of FIG. 2, as referred to in greater detail below, are therefore considered as being highly interchangeable with other components having the same digital signal processing capabilities.

Figure 2:
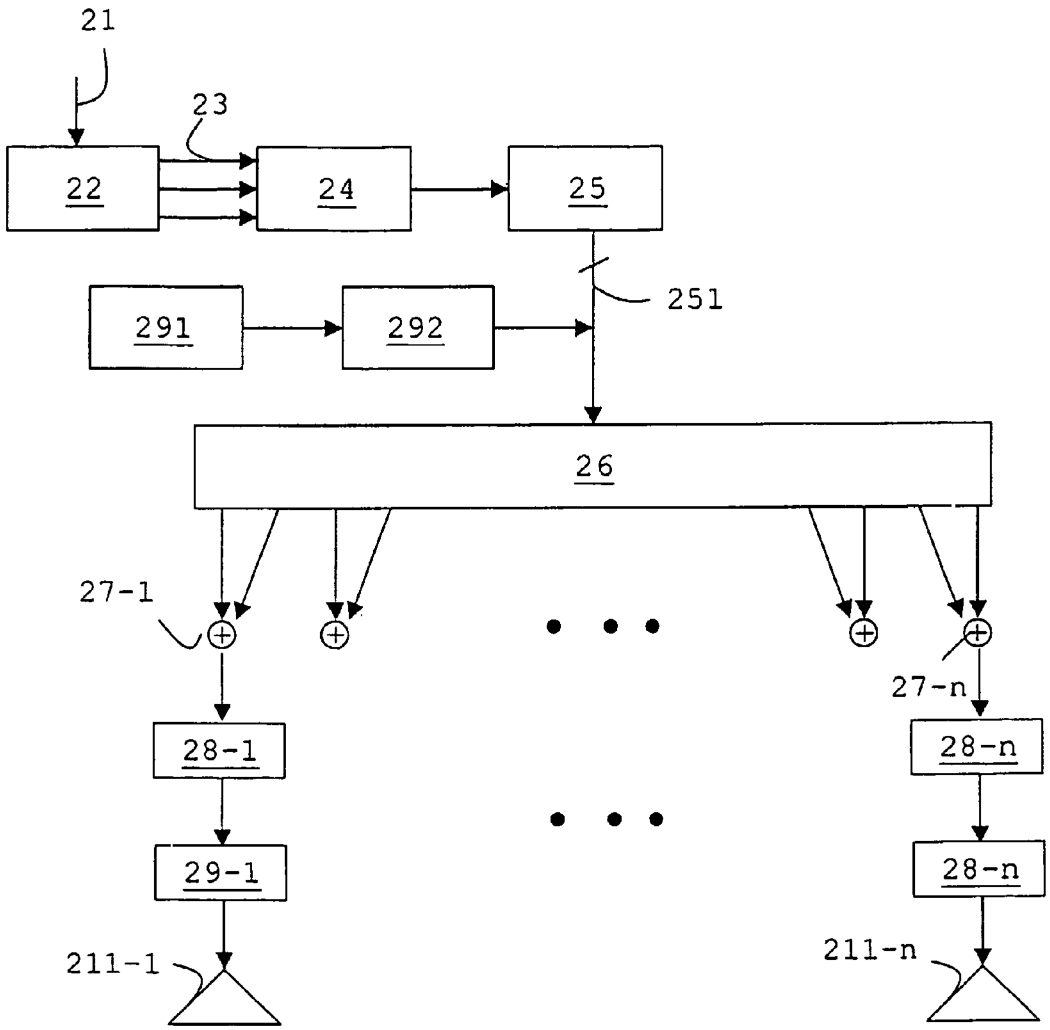
FIG. 2 is a block diagram showing several signal processing stages prior to emission within a multi-transducer source.

In FIG. 2, audio source data is received by the DLS via inputs 21 as either an optical or coaxial digital data stream in the S/PDIF or any other known audio data format. The data may contain simple two-channel-stereo signal or modem compressed and encoded multi-channel sound reproductions such as Dolby Digital™ 5.1 or DTS™ sound. Multi-channel inputs 21 are first decoded and decompressed using digital signal processing devices and firmware 22 designed to handle these proprietary acoustic data formats. Their output is fed into three pairs of channels 23. In turn, the channel pairs provide the input to a multi-channel sample rate converter 24 for conversion to a standard sample rate and bit length. The outputs of the sample-rate-converter stage 24 are combined into a single high-speed serial signal comprising all six channels. In case of a conventional stereo input, only two of these may contain valid data.

The serialized data enters Digital Signal Processing (DSP) unit 25 to further process the data. The unit comprises a pair of commercially available Texas Instruments TMS320C6701 DSPs running at 133 MHz and performing the majority of calculations in floating point format.

The first DSP performs filtering to compensate for the irregularities in the frequency response of the transducers used. It provides four-times over-sampling and interpolation to remove high-frequency content generated by the over-sampling process.

The second DSP performs quantization and noise shaping to reduce the word length to nine bits at a sample rate of 195 kHz.

The output from the second DSP is distributed in parallel using bus 251 to eleven commercially available Xilinx XCV200 field programmable gate arrays (FPGAs) 26. The gate arrays apply a unique time delay for each channel and for each transducer. Their output is a number of different versions or replicas of the input, the number being equal to the number of transducers times the number of channels. As the number of transducers 211-1 to 211-n in this example is 132, several hundred different versions or replicas of the input are generated at this stage. The individual versions of the channels are summed at adders 27-1 to 27-n for each transducer and passed to pulse width modulators (PWM) 28-1 to 28-n. Each pulse width modulator drives a class-D output stage 29-1 to 29-n whose supply voltage can be adjusted to control the output power to the transducers 211-1 to 211-n.

System initialisation is under the control of a micro-controller 291. Once initialised the micro-controller is used to take direction and volume adjustment commands from the user via an infrared remote controller (not shown), display them on the system display, and pass them to the third DSP 292.

The third DSP in the system is used to calculate the required time delay for each channel on each transducer to be able to steer, for example, each channel into a different direction. For example, a first pair of channels can be directed to the right and left side-walls (relative to the position of the DLS) of a room while a second pair is directed to the right and left of the rear-wall to generate a surround sound. The delay requirements, thus established, are distributed to the FPGAs 26 over the same parallel bus 251 as the data samples. Most of the above steps are described in more detail in WO-0123104.

Figure 3:
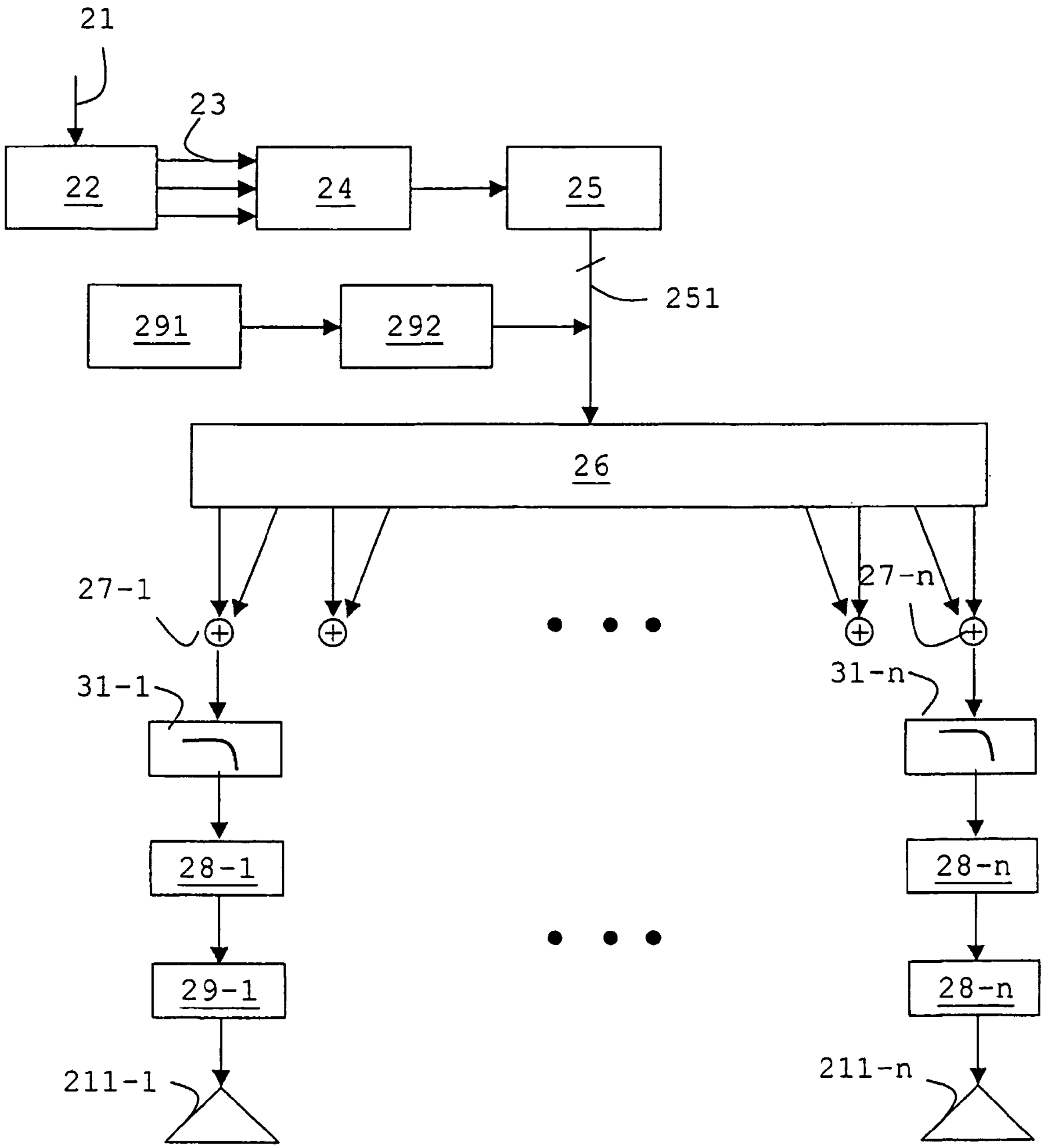
FIG. 3 is the block diagram of FIG. 2 modified in accordance with an embodiment of the invention.

Referring now to a first embodiment of the invention as shown in FIG. 3, an additional filtering process 31 is added to the signal path of FIG. 2. In should be noted that in order put emphasis on the changes introduced by the present invention the same reference numerals and characters designate like parts in FIGS. 2 and 3, respectively.

In FIG. 3, digital filters 31-1 to 31-n are applied after the signals have been separated according to channel and added. The output of the digital filter stage is sent to the PCM stage 28-1 to 28-n of each of the transducers 211-1 to 211-n. The digital filters 31-1 to 31-n can be implemented by separate DSPs or gate arrays, or, in fact, may just be included into other signal processing devices 25, 26.

As the physical implementation of the digital filters may vary in accordance with the electronic components used to build the DLS, the filters are better described in terms of their desired response or effect on the signal.

The filters are designed to control or modify the output of the transducers depending on the frequency of the signal to be emitted. Within a frequency range of 500 Hz to 10 kHz the filters 31-1 to 31-n seek to maintain an approximately constant beamwidth. This is done in practical terms by imposing frequency dependent windows onto the output amplitude of the transducers 211-1 to 211-n of the array. Hence, the new filters reduce the gain of transducers depending on their relative position within the array and on the frequency content of the signal to be emitted.

In the following section, making reference to FIGS. 4 to 6, this embodiment of the invention and further variants thereof will be described in more detail.

Figure 4:
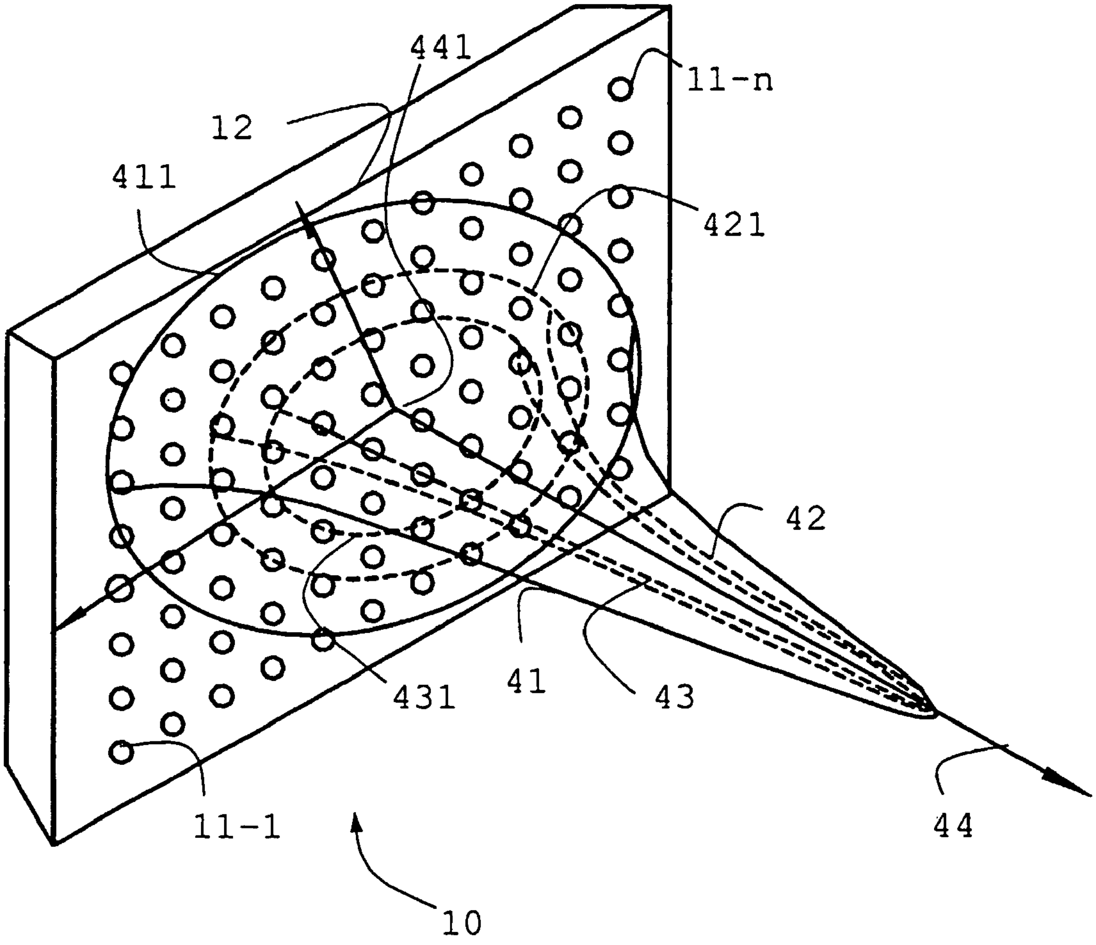
FIG. 4 is a side view illustrating the effect of the invention on the device of FIG. 1.

In FIG. 4, there is illustrated the effect a device in accordance with an embodiment of the invention has on the operation of an array 10 of transducers 11-1 to 11-n. Again, the numerals used in FIG. 4 are equal to those used in FIG. 1 for equal or equivalent elements.

The two-dimensional plots 41, 42, 43 shown in FIG. 4 illustrate the output gain applied to the transducers of the array at three different frequencies f1, f2 and f3 in order of increasing frequency. The transducer array defines a plane having a point of origin 441 or zero point located at the centre of the array 10. Perpendicular to the plane as defined by the array, there is shown a virtual axis 44 representing the gain of the emitted signals. An arbitrary albeit high attenuation is defined as the cut off level and drawn to coincide with the plane of the transducer array. Thus, the curves 411, 421, 431, representing the cut-off level for signal content having a frequency f1, f2 and f3, respectively, indicate which of the transducers of the array 10 contribute to the emission: Transducers positioned within the boundary set by curve 411 contribute to the emission of signal having the frequency f1, transducers positioned within the boundary set by curve 421 contribute to the emission of signal having the frequency f2, and so forth. Transducers located outside the respective boundaries are operated at cut-off gain or below. The area enclosed by curves 411, 421, 431 are three representatives of what in the following is referred to as the effective emission area of the array at a given frequency f.

It is now a purpose of the invention to control the effective emission area within limits mainly set by frequency and physical dimensions of the array as a means to set or select a frequency independent beamwidth. By varying the effective area as a function of the frequency this selected beamwidth can be held at constant or near constant value over a broad range of frequencies, typically an octave or more. To this end, use is made of the functional relation between beamwidth and the linear dimensions of the effective emission area. In the simplest case of a one-dimensional array of (infinitely small) sources this functional relation can be represented by formula [1]:

$$l_{eff} = \frac{c}{2f \sin\theta_{BW}} \qquad [1]$$

wherein $l_{eff}$ is the effective half length of the array at the frequency f for a given beamwidth $\theta_{BW}$ (given as the angle between the two minima limiting the main beam). The constant c is the speed of sound in air.

Thus, by selecting a beamwidth $\theta_{BW}$ adapted to the specific environment in which the invention is sought to be implemented, the signal processing devices 31-1 to 31-n of FIG. 3 can be programmed to reduce the output of the transducer in a frequency-dependent manner to generate an effective emission area in accordance with formula [1].

However, the application of [1] assumes a sudden drop of the emitted signal from full to zero signal amplitude at the edge of the effective area. In the context of FIG. 4, the attenuation plots 41, 42, 43 would depict, instead of a smooth increase to full signal strength, a single step to full strength at the boundary curves 411, 421, 431, equivalent to the application of a rectangular window. However, introducing a sharp edge into the emission area is likely to cause an undesirably high amount of energy to be emitted in sidelobes, i.e., less directed sound. Therefore, there a more preferred variants of the invention to be described in the following, which variants spread the edge zone over a broader transition zone surrounding the effective emission area. Within this area the transducers are controlled such that their gain is gradually reduced to zero depending on their radial distance from a centre of the array. In FIG. 4, the transition zone is illustrated in a disproportional manner leading to very pointed attenuation profiles or windows. In practice any known window function with tapering edges can be applied to create an effective emission area with a transition zone at the edge.

The choice of the window function is determined by a compromise between desired beamwidth and sidelobe level. Suitable window functions include the Hann window, which can be represented by formula [2-1]

$$w(r) = \cos^2\left(\frac{\pi r}{2a}\right), \text{ if } |r| < a \text{ (and zero otherwise).} \qquad [2\text{-}1]$$

For the Hann window having a relation linking the effective half length $l_{eff}$ of the window with frequency at a given beamwidth $\theta_{BW}$ is:

$$l_{eff} = \frac{c}{f \sin\theta_{BW}} \qquad [2\text{-}2]$$

Another applicable window is the cos window represented by $$w(r) = \cos\left(\frac{\pi r}{2a}\right), \text{ if } |r| < a \text{ (and zero otherwise).} \qquad [3\text{-}1]$$

For the cos window, the equivalent of relation [2-2] can be written as $$l_{eff} = \frac{3c}{4f \sin\theta_{BW}} \qquad [3\text{-}2]$$

Other applicable window functions include Hamming-, Kaiser- or Chebyshev-type windows or windows of the sin(x)/x type (which become Bessel functions in two dimensions), all of which are widely documented.

Application of such window functions leads to a modified relation [1], [2-2] and [3-2] between frequency and effective array length.

The use of these tapered window functions broadens the effective length $l_{eff}$ compared to formula [1] which represents a box-car window. However, the general characteristic of [1] holds, i.e. to maintain a constant beamwidth the effective emission area needs to be decreased with increasing frequency and vice versa.

After selection of a suitable window function, a set of desired filter responses can be derived from it, as shown when referring to FIGS. 5A and 5B below. Using standard design tools the desired filter response can then be converted into filter coefficients that implement the filter in the digital domain. A known method to derive from the filter response the filter coefficients is for example using an inverse Fourier transform. Known mathematical or engineering programs, such as MATLAB™, are readily capable of performing the necessary conversion steps. The filters of this embodiment are linear phase finite impulse response filter, as it is regarded as beneficial to maintain phase relationships and delays introduced through the beam steering process.

Alternative filter architectures, such as infinite impulse response filters with all-pass phase correction stages can be used.

Independent of the filter architecture, it is possible to perform the complete signal processing, including the control process of the present invention and known beamsteering methods within a single digital signal processing step.

Again, many of the filter parameters (e.g. length of the filter, gain etc) are subject to constraints determined by the available electrical and electronic components. For an audio system the constraints are further determined by the necessity to shape the signal in real-time at audio frequencies, i.e. between 20 Hz and 20 kHz.

As stated before, the effective emission area decreases with increasing frequencies, leaving fewer and fewer transducers to contribute to the output signal. Conversely, as the frequency decreases, the area increases. This general property leads to further advantageous modification of the window shape and thus the filter design.

Firstly, as the width of the window shrinks towards higher frequencies and taking further into account the finite width of any transducer, eventually only a transducer placed at the very centre of the array reproduces the highest frequencies. These frequencies are, therefore, not steered at all.

By setting a minimum window width, it can be ensured that a sufficient number of transducers are within the window radius at the cut-off level to give the signal some steerability. Applying a minimum window width causes the beam to further narrow at higher frequencies, but, depending on the application, that may be preferable to having no directivity at all.

At the low frequency limit, i.e., as the window reaches the physical width of the array, several different window designs can be applied. Each of the designs has advantages and weaknesses with respect to different aspects of the sound emission process.

Figure 5A:
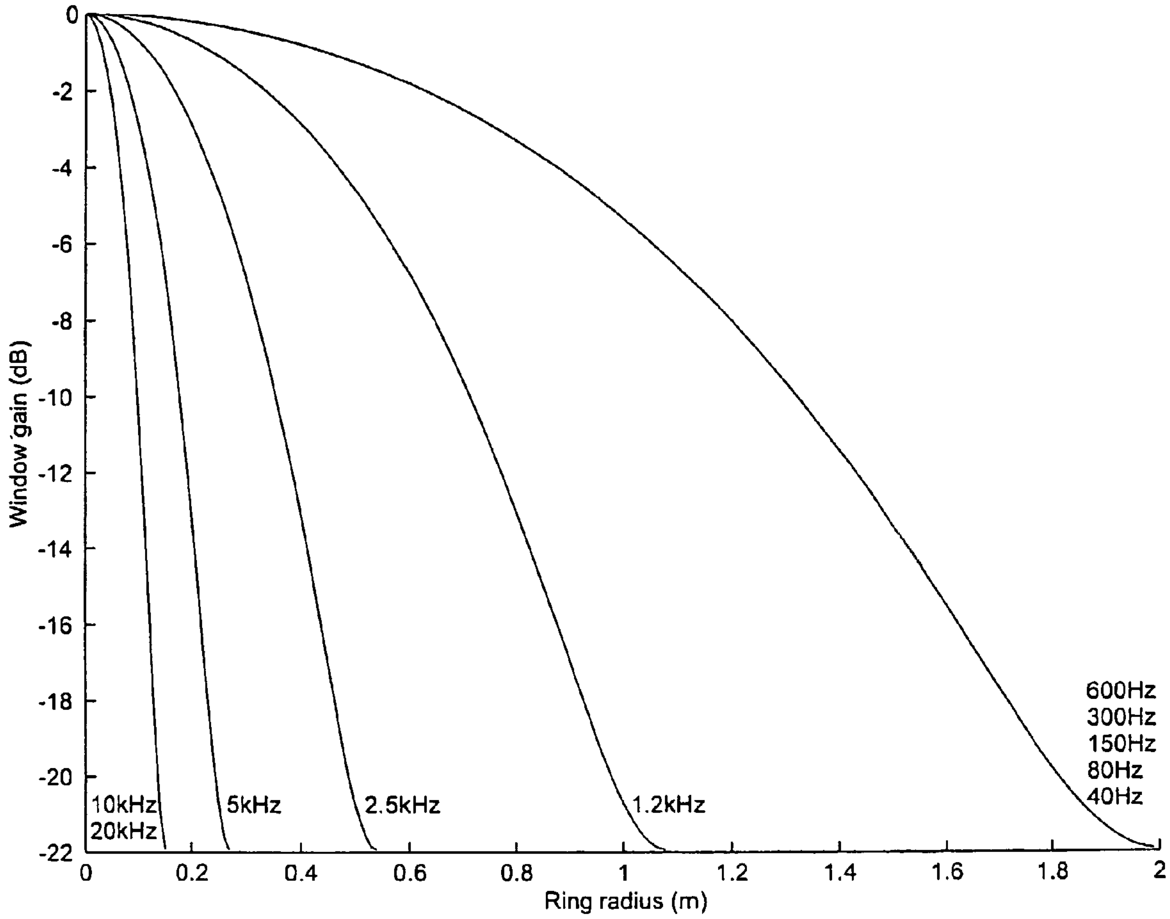
FIG. 5A is a plot of gain window functions in accordance with a first example of the invention.

In the example of the present invention as illustrated by FIG. 5A, a minimum and a maximum window are set to accommodate for the physical limits of the array. The plots of FIG. 5A are one-dimensional graphs of a Hamming-type window function showing amplification or gain (in dB) factor versus radial distance (in meters) from the centre. The window function is plotted at ten different frequency values ranging from 10 kHz to 40 Hz. However, due to the implementation of a minimum and maximum window, the plots for 10 and 20 kHz at the high frequency end and for 600, 300, 150, 80 and 40 Hz at the high frequency end are identical. The plots for 5 kHz and 2.5 kHz and 1.2 KHz are shown as separate curves. The cut-off is set at an attenuation of −22 dB, the lower bound of the Hamming window. The limiting curves at 10 KHz and 600 Hz, respectively, represent the high and low frequency end to ensure a minimum width and a maximum width of the window. In the example, curve 10 Khz applies to all frequencies above 10 kHz, thus ensuring that steerability is maintained above this frequency. Curve 600 Hz applies to all frequencies below 600 Hz avoiding a sudden change in low frequency signal level at the edge of the array. This variant suppresses sidelobes, but at the expense of a low utilisation of the transducers at the fringe of the array.

Having determined the desired shape of the windows, digital filters can be derived therefrom.

To derive a digital filter for transducer located for example at position R=0.64 m, a frequency response characterizing the filter is obtained (conceptionally) by registering the attenuation values against the frequency values taking vertical section at position R through the window function of FIG. 5A. As can be seen, the cut-off frequency at R=0.64 m is below 2.5 kHz. Towards lower frequencies the filter gain increases rapidly until curve for 600 Hz is reached. The corresponding attenuation value of −1 dB is maintained by the filter for all frequencies below 600 Hz.

Figure 5B:
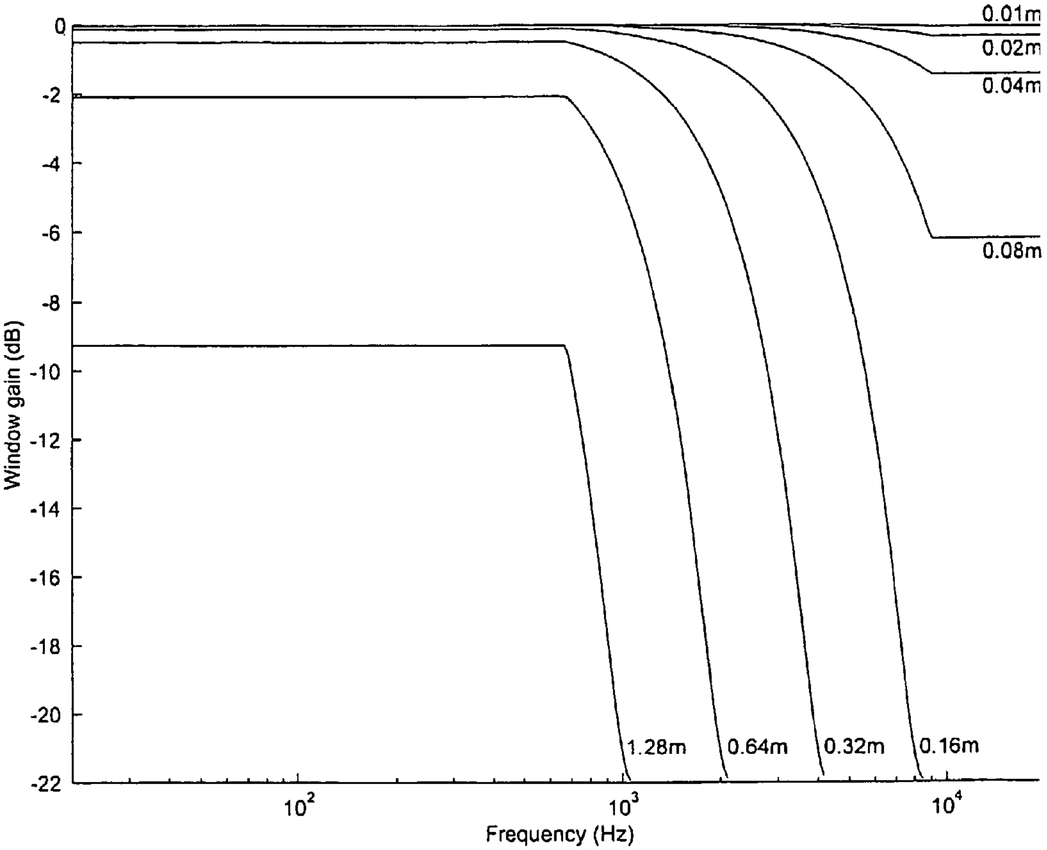
FIG. 5B shows frequency responses of digital filters derived from the window functions of FIG. 5A.

In FIG. 5B, there are shown filter frequency responses for transducer positions of 1.28 m, 0.64 m as described above, 0.32 m, 0.16 m, 0.08 m, 0.04 m, 0.02 m and 0.01 m, respectively. The distances are measured as radial distance from the centre of the array.

It should be noted that the use of discretely spaced transducers implies that the above continuous treatment of the window function is only a rough approximation. However the effects of the discrete nature of the transducers are equivalent to those arising from the approximation of an integral by a Riemann sum and can be equally compensated for. For example, when calculating the filter response from a given window function, the discrete spacing of the transducer can be accommodated for by the trapezoid rule. Application of the trapezoid rule weights the window function at any discrete point with a factor proportional to the distance between adjacent transducer positions. Higher order approximations, such as polynomial based or other, can also be used.

Given a numerical representation of the window functions or an equivalent frequency response of a digital filter and applying it to the above mentioned filter design tool derives filter coefficients that can be loaded into the digital filters shown in FIG. 3. The filter coefficients derived by the above steps vary continuously over the range of frequency and radial locations that are important to the application in questions.

In FIG. 5, a limiting curve at 600 Hz has been introduced to apply to all frequencies below the frequency at which the window width and thus the effective emission are would exceed the limits of the physical array. Effectively, this imposes a tapered or smooth emission at the edge of the array for the full frequency range or bandwidth of the signal. However, other implementations are possible that increase the usage made of the outer transducers of the array.

Figure 6A:
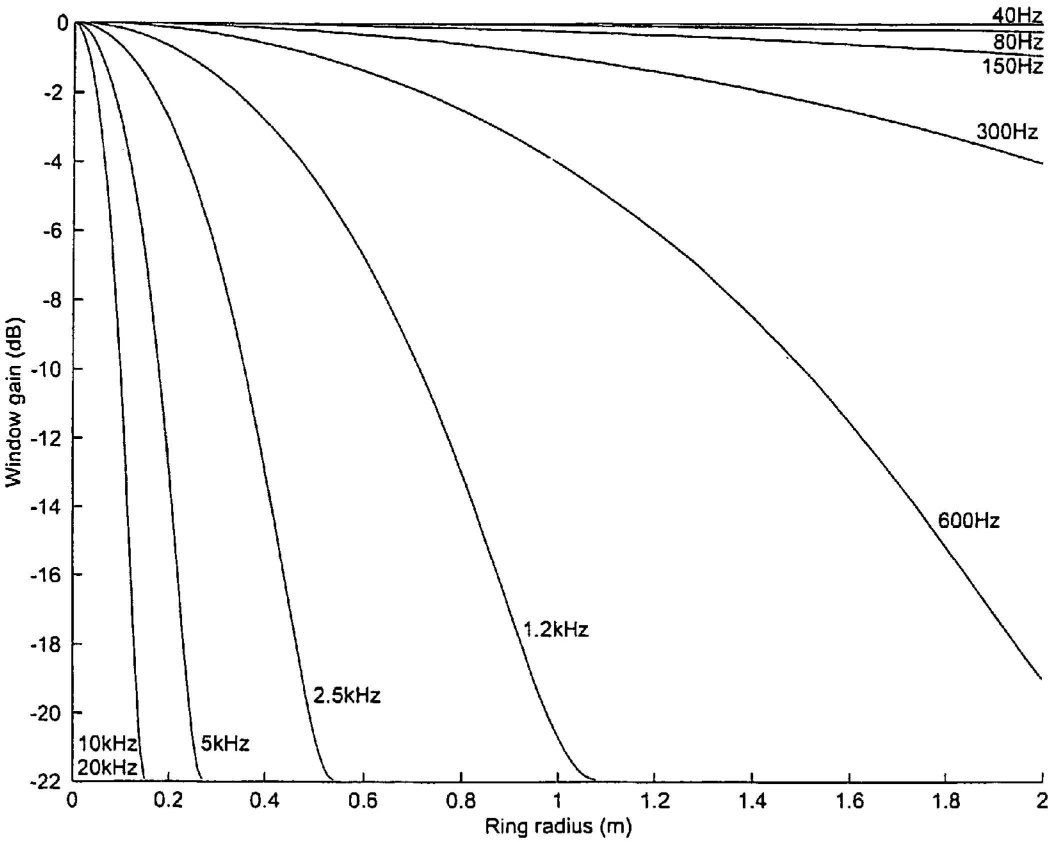
FIG. 6A is a plot of gain window functions in accordance with a second example of the invention.
Figure 6B:
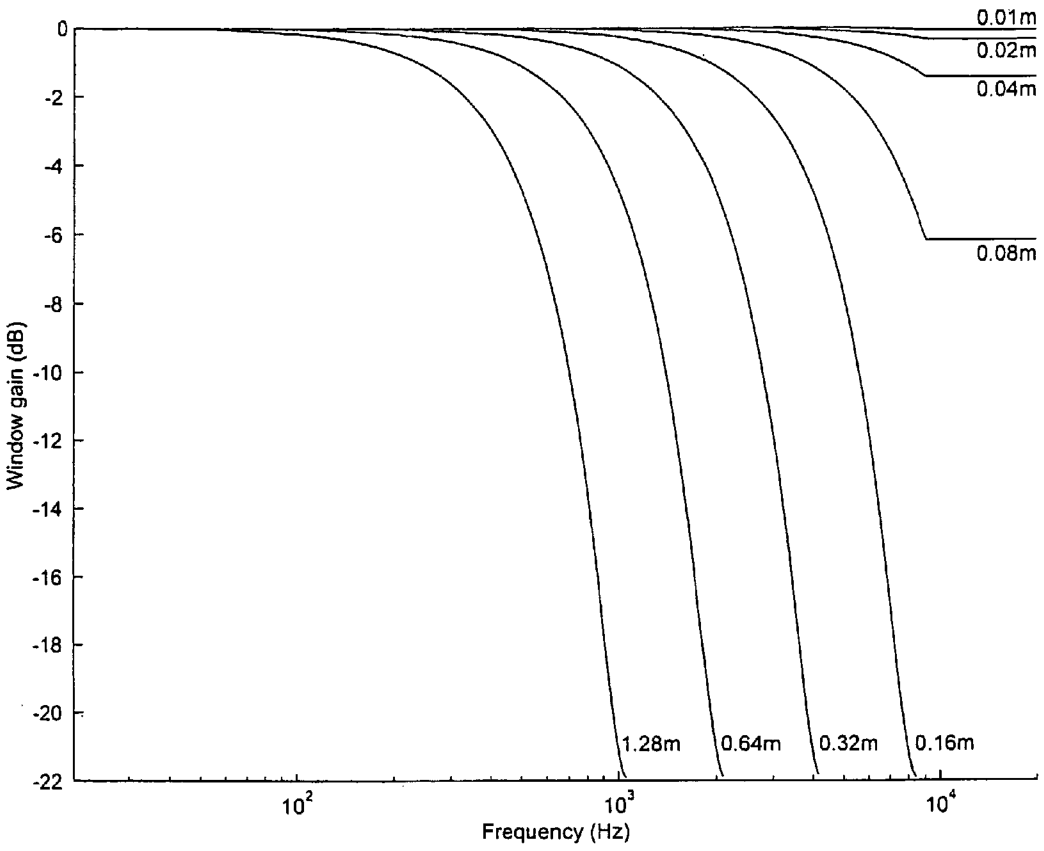
FIG. 6B shows frequency responses of digital filters derived from the window functions of FIG. 5A.

In the example illustrated by FIGS. 6A and 6B, the effective emission array is allowed to grow beyond the physical limits of the array. In FIG. 6A, a number of the one-dimensional graphs of the window function show amplification or gain (in dB) factor versus radial distance (in meters) from the centre for 10 kHz, 5 kHz, 2.5 kHz, 1.2 kHz, 600 Hz, 300 Hz, 150 Hz, 80 Hz and 40 Hz, respectively. A minimum window is imposed. However, the window functions of FIG. 6A have a finite output level beyond 2 meters, whereas the all windows of FIG. 5A drop to zero at this radius or even smaller radial positions. In terms of output of the transducers, a comparison of FIGS. 5B and 6B, both showing the response function at the same set of radial positions, demonstrates a generally higher output level in the response functions of FIG. 6B at low frequencies. However, the general level of the output is increased at the cost of introducing a step change in output level at the edge of the array. This step increases with decreasing frequency and, in turn, may result in more low-frequency energy being emitted into sidelobes.

Figure 7:
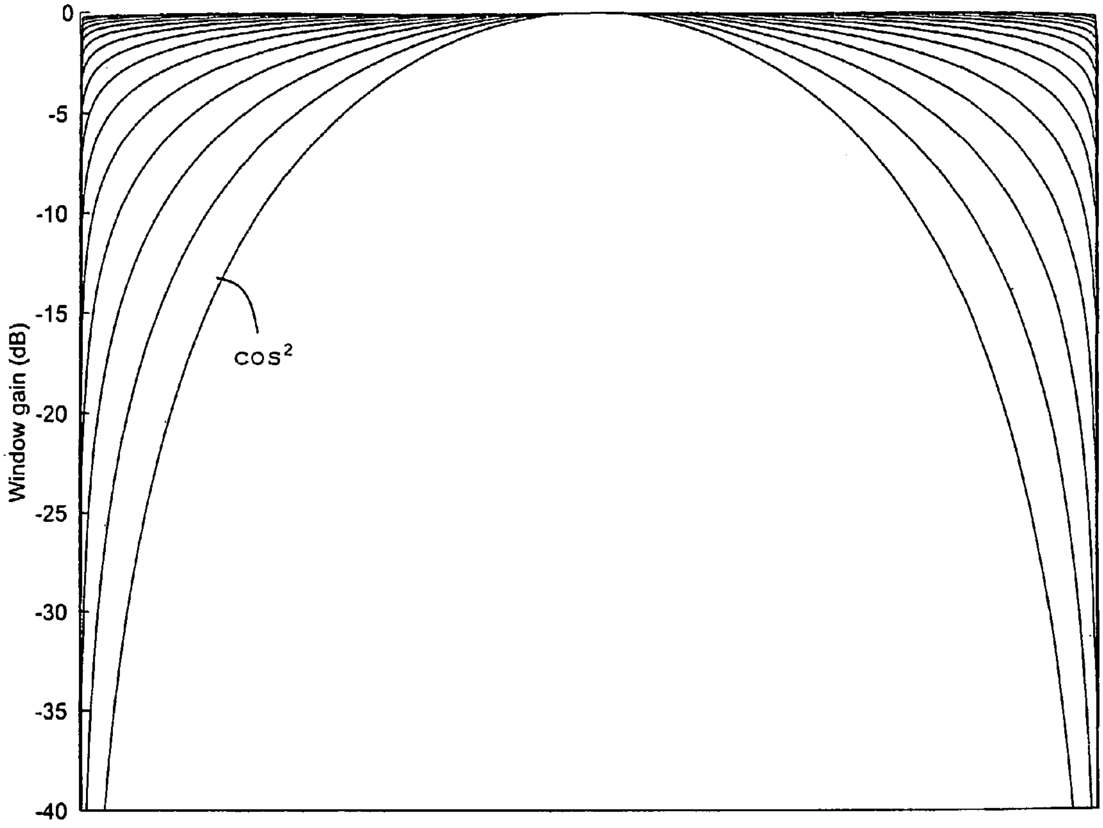
FIG. 7 is a plot of gain window functions with increased gain at lower frequencies.

Another approach to address the finite length of the array is to use a family of window functions: As the frequency of the first window function reaches a value at which the function essentially covers the whole width of the array, i.e. each transducer is being used, windows of the same width but with increasing average value could be used to improve the low frequency power output without introducing discontinuities. In the example as illustrated by FIG. 7, a $\cos^x$ window function is used, wherein the power x equals 2 for all frequencies where the window is equal to or smaller than the array width. As the window reaches the limits of the array and the frequency is decreased further, ever-smaller values of x are selected for the window function. As shown in FIG. 7, this increases the amplitude or gain levels while the maintaining the width of the window.

According to the above embodiments, each transducer has a separate filter depending on its radial position. However, it is possible to exploit rotational symmetry or approximate rotational symmetry to reduce the number of filters. In cases where a number of transducers share a radial position having different angular coordinates, e.g., are arranged on a circle, these transducers will require the same low-pass filtering, so their input signals can advantageously be multiplexed through common filters.

Also, different beamwidths can be applied to different channels of the digital loudspeaker system. Audio channels projected at more distant walls may require a minimal beamwidth whereas channels projected at surfaces closer to the DLS may be advantageously operated employing a broader beamwidth. By choosing different beamwidth $\theta_{BW}$ in the formulae [1], [2-2], [3-2] or any equivalent relation, different sets of windows and, hence, different sets of filters are generated, which in turn can be applied to these different channels.

It will be appreciated by a skilled person from the above description that the gist of the above described embodiments of the invention is to give the user a high degree of control of the output characteristic of the DLS. While being applicable to any array of transducers, in particular the known regularly spaced array of transducers as shown in FIG. 1, the invention seeks to take advantage of the improved control by introducing arrays with irregular spacing between the transducers. From the description below, it will be appreciated that the irregular array designs as proposed by the present invention share a less density of transducers at the outer fringes of the array. In other words, the spacing between the transducers increases with distance from the centre of the array. An extremely important advantage of this aspect of the present invention is to significantly reducing the number of transducers required to generate a steerable broadband signal beam compared to known array designs.

To prevent sidelobes caused by spatial aliasing, the maximum spacing between array elements must be less than some fraction of the wavelength of the highest frequency of interest that they are emitting. This fraction is best chosen to be in the range of 0.25 to 0.5. For broadband arrays, whose size is determined by the lowest frequency of interest, this constraint, when combined with a uniform spacing can result in a very large number of transducers. However, the maximum allowable spacing, is proportional to the highest frequency being reproduced at any point within the array. Since with the above window design only the central array elements reproduce the highest frequencies, this is the only area that needs the highest transducer density, and elements can become gradually wider spaced towards the edges of the array.

In a further variant of the array layout, larger transducers are advantageously used where the spacing of individual transducers becomes wider, i.e. towards the outside of the array. Larger transducers are more efficient at producing low sound frequencies. However, ready usage of large transducers is restricted by a technical phenomenon generally referred to as "high-frequency beaming". High-frequency beaming is the (undesired) directional radiation from a pistonic transducer arising when the diameter of the transducer is of the order of the wavelength or larger. In the present example, however, any transducer which is small enough to satisfy the maximum allowable spacing is also small enough to have negligible beaming effects, as its diameter is much less than a wavelength.

For broadband arrays, it may be advantageous to use two, three or more sizes of transducer. Where several dissimilar types of transducer are used together in an array, it may be necessary to use filters to compensate for their differing phase responses.

Although ideally the whole array is used to reproduce the lowest frequencies, a small area at the centre of the array (i.e. the small and densely packed transducers) can be excluded by appropriate band filtering, e.g., by placing a high-pass filter in the signal path transmitting the signal to these central transducers. Or, the frequency response, more specifically a poor low-frequency response of the transducer can be directly exploited to achieve a similar effect. The steerability of the beam is largely not adversely affected by such barring of low-frequency output from the central transducers, if the central area has a diameter that is a fraction of the signal wavelength in question. This idea can be generalised to encompass several types of transducers, each with a different low-frequency cut-off.

Since the filters for the densely packed array transducers in the central area of the array have high cut-off frequencies and a smooth response at low frequencies, relatively short finite-impulse-response (FIR) filters can be used. For transducers closer to the fringe of the array, the cut-off frequencies are much lower, so usually longer filters are used. In the above embodiment, however, these outer transducers do not emit the high frequency content of the signal. Therefore, it is readily feasible to use multirate signal processing and downsample the signal to be emitted by the outer transducers to a fraction of the original sample rate, allowing the use of shorter filters while maintaining the degree of control.

In variants using a non-uniform distribution of transducers within the array, it is further found to be advantageous to ensure a uniform output per unit area of the array prior to the application of windowed emission. This is conveniently done be scaling the output of each transducer by an appropriate factor. This factor is for example inversely proportional to the output per unit area at the location of the transducer. Having a uniform power output facilitates the application of the above aspects of the present invention. However as above, the general nature of digital signal processing allows folding this scaling process into the general filtering process resulting in one set of filters.

There are many ways to design arrays that conform to the above constraints. The best approach may be to use a numerical optimisation technique. However, in the following section a deterministic but sub-optimal approach is described that has the advantage of producing visually pleasing layouts.

According to this example, a grid is formed covering the dimensions of the proposed array. Although a uniform grid could be used, since placement accuracy becomes less important with lower frequency transducers, an irregular spacing with high density in the middle of the array is more efficient.

The following parameters are given at the onset of the design process:

X, Y Dimensions of the array m Minimum practicable spacing for the transducers (one type only for simplicity)

Alpha Maximum acceptable fraction of a wavelength transducer spacing

Beta The desired ratio of array width to wavelength f_max The maximum frequency to be reproduced by the array c Speed of sound Following a square spiral path over the grid, starting in the centre, expanding to cover the whole array, at each location:

Evaluate the distance r of the current location from the centre

Evaluate the cut-off frequency f_c=min((Beta*c)/(2*r), f_max)

Evaluate the minimum permissible transducer spacing s=c*Alpha/f_c

Evaluate the practicable spacing s_p=max(s,m)

Evaluate the distance to the centre of the nearest already-placed transducer, s_m if s_m>s_p, place a transducer here Beta can have different values horizontally and vertically, to allow for elliptical beams. For DLS projectors, this cam be used to improve for example the horizontal steerability for a given number of array elements or transducers.

To ensure the greatest low-frequency directivity for a given array size, transducers can be manually placed at the extremities of the array when initialising the above algorithm. When then executing the algorithm, the position of the other transducers is calculated taking any initially placed transducers into account.

Grid locations on the array need not to be visited in a spiral sequence. Following other paths results in arrays with different properties. Good symmetry, resulting in a visually appealing product, can be achieved by following a path as shown (for a very small grid) in FIG. 8A where the grid points are visited in the sequence of the numerals assigned to it.

Figure 8B:
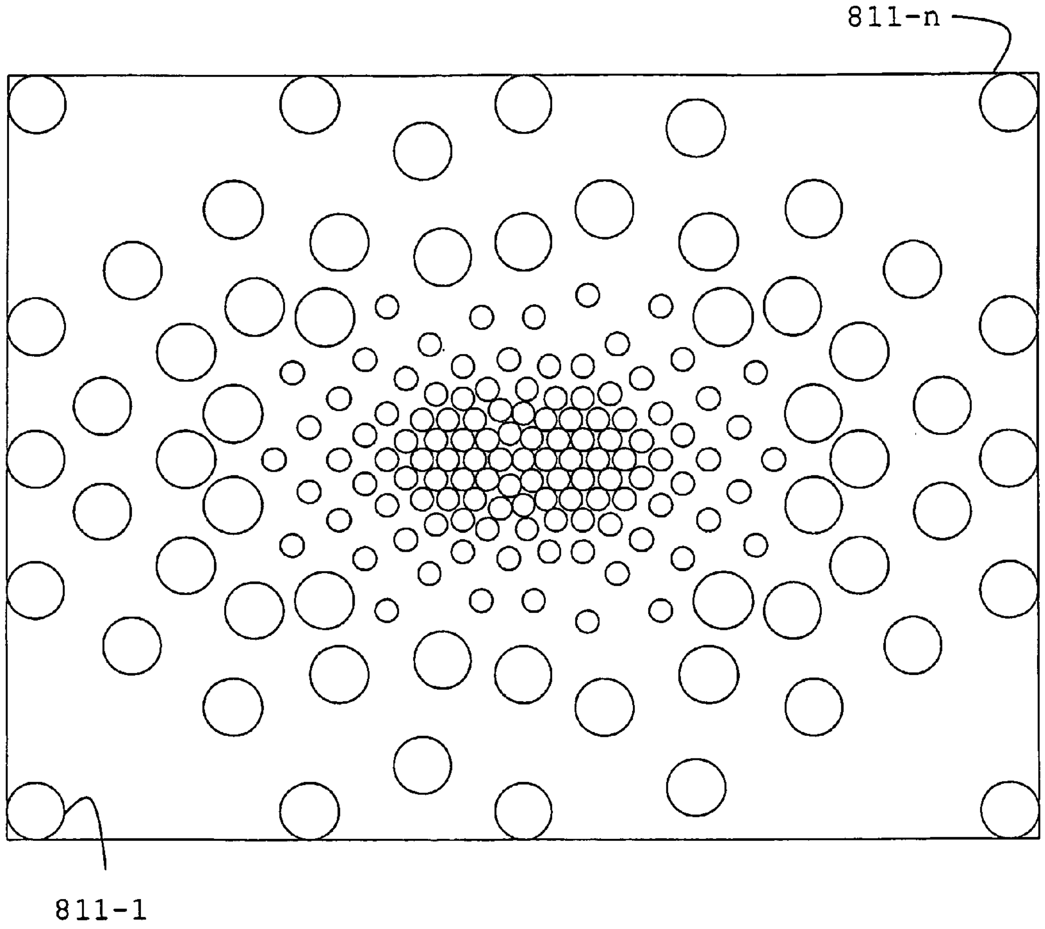
FIG. 8B is an array layout generated in accordance with an example of the invention and the path pattern of FIG. 8A.

FIG. 8B shows an array designed using this method, with a greater value for Beta horizontally than vertically. Transducers 811-1 to 811-n are placed such that the above described constraints are met. Also, the transducer vary in size, with smaller diameter transducers positioned at the centre of the array.

Figure 9A:
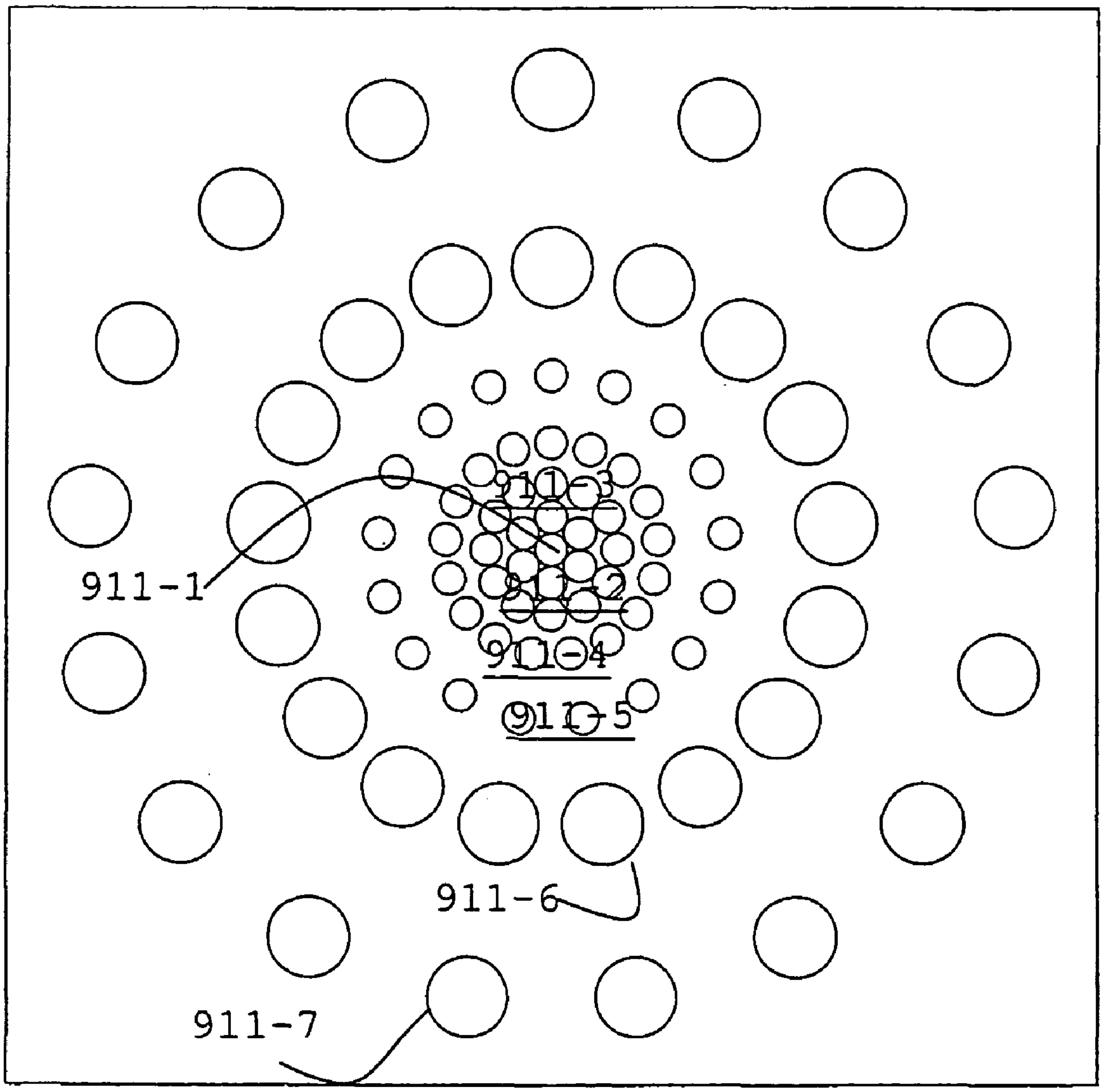
FIG. 9A shows a radial array layout of an array in accordance with an example of the invention.

An alternative approach to designing layouts of the transducer array is to use concentric rings of transducers. Starting with one transducer in the middle of the array, rings are added with the increase in ring radius and the number of elements in the ring chosen to satisfy the maximum permissible transducer spacing, as evaluated in the previous array layout algorithm. FIG. 9A shows an array generated by this method with transducers arranged in six concentric rings 911-2 to 911-7 with one transducer 911-1 located at the centre. Transducers at the two outer rings 911-6, 911-7 are of larger diameter than those in the centre.

Figure 9B:
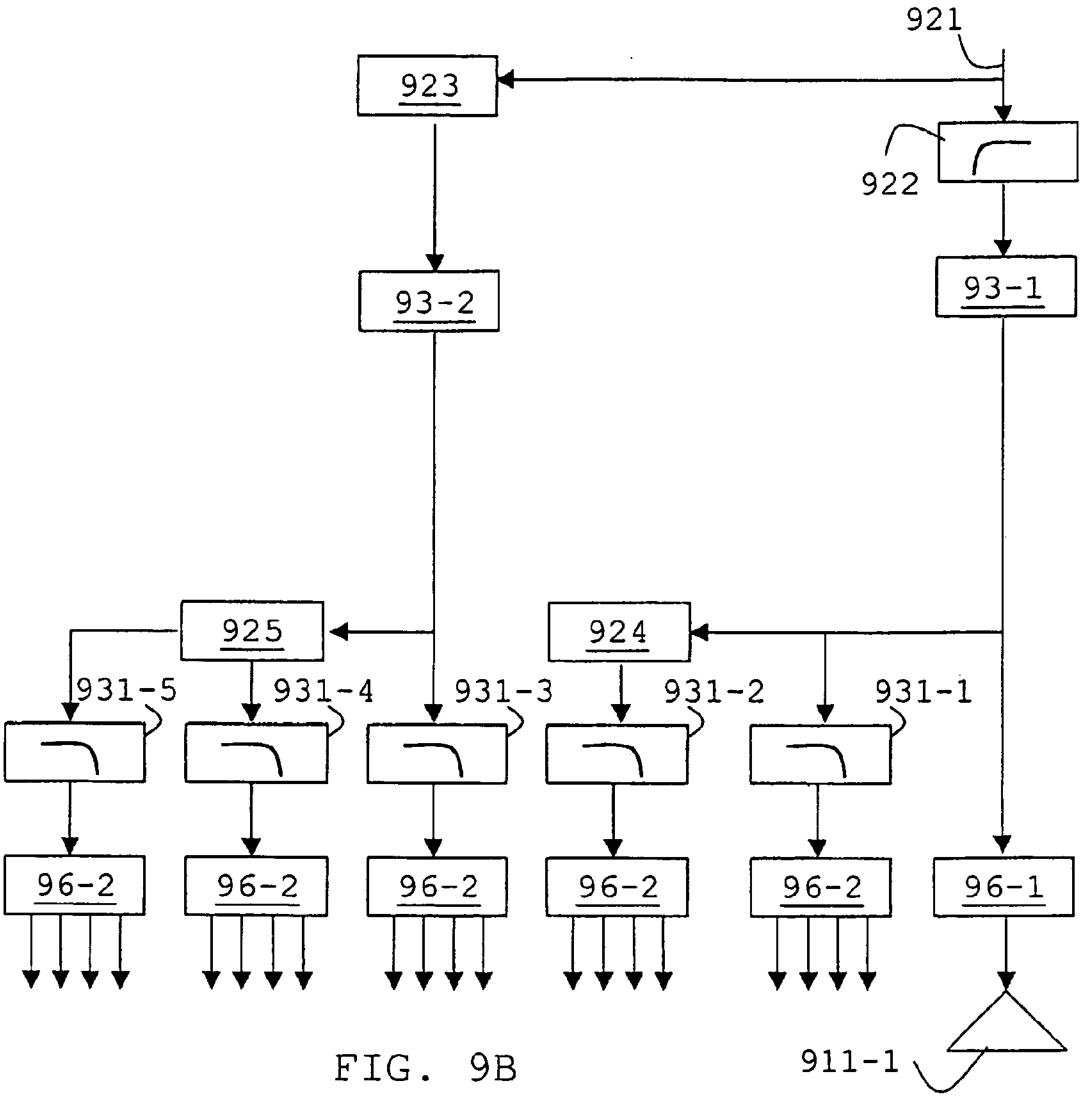
FIG. 9B is the block diagram of FIG. 3 showing a variant in accordance with the array layout of FIG. 9A.

FIG. 9B is a block diagram of a possible implementation of the signal processing required for such an ordered array. An audio signal input 921 enters high-pass filter 922 that removes low frequency components of the signal from the part of the signal to be emitted by the smaller central transducers. A stage 923 removes high frequency content from the part of the signal to be emitted by the larger transducers 911-6, 911-7 at the outer fringes of the array and resamples the remaining signal at a lower sample rate. It should be noted that this and later resampling does not cause a loss or deterioration of the signal as the later filtering stages that implement the effective emission area ensure that the outer transducers do not contribute to the high-frequency components of the signal.

Signal correction filters, 93-2 compensate for the differing amplitude and phase responses of the smaller and larger transducers.

As the single centre transducer 911-1 will always emit all high-frequency components, the signal of the compensation stage 93-1 enters directly into a digital signal processing and delay adding stage 96-1 that is equivalent to a combination of stages 26, 27, 28 and 29 of FIG. 2. This stage provides the appropriate delays, modulation etc. necessary to control and drive the transducer for a beam steering operation of the DLS. In the signal path to the innermost ring of small transducers, there is a first filter 931-1 implementing a window function in accordance with the invention. In the signal path to the wider ring of small transducers, the signal passes through a further downsampling stage 924 before entering into a second filter 931-2 to implement the window function. Similar stages of filtering 931-3 to 931-5 and downsampling 925 towards transducers located further away from the centre are present in the signal path to the large transducers.

In accordance with the variant, the each of the filters 931-1 to 931-5 are shared between all the transducers within one ring. And, thus, the number of computational operations on the signals is significantly reduced by effectively exploiting the symmetry of the layout. This contrasts with the scattered arrays described in FIG. 8B, which may have only 2 or 4 transducers sharing the same filter.

It is possible to extend the ordered array approach to use non-circular ‘rings’. This corresponds to the use of non-circular window functions. Using differing Beta values on each axis (as in FIG. 8B) corresponds to an elliptical window function.

Figure 10:
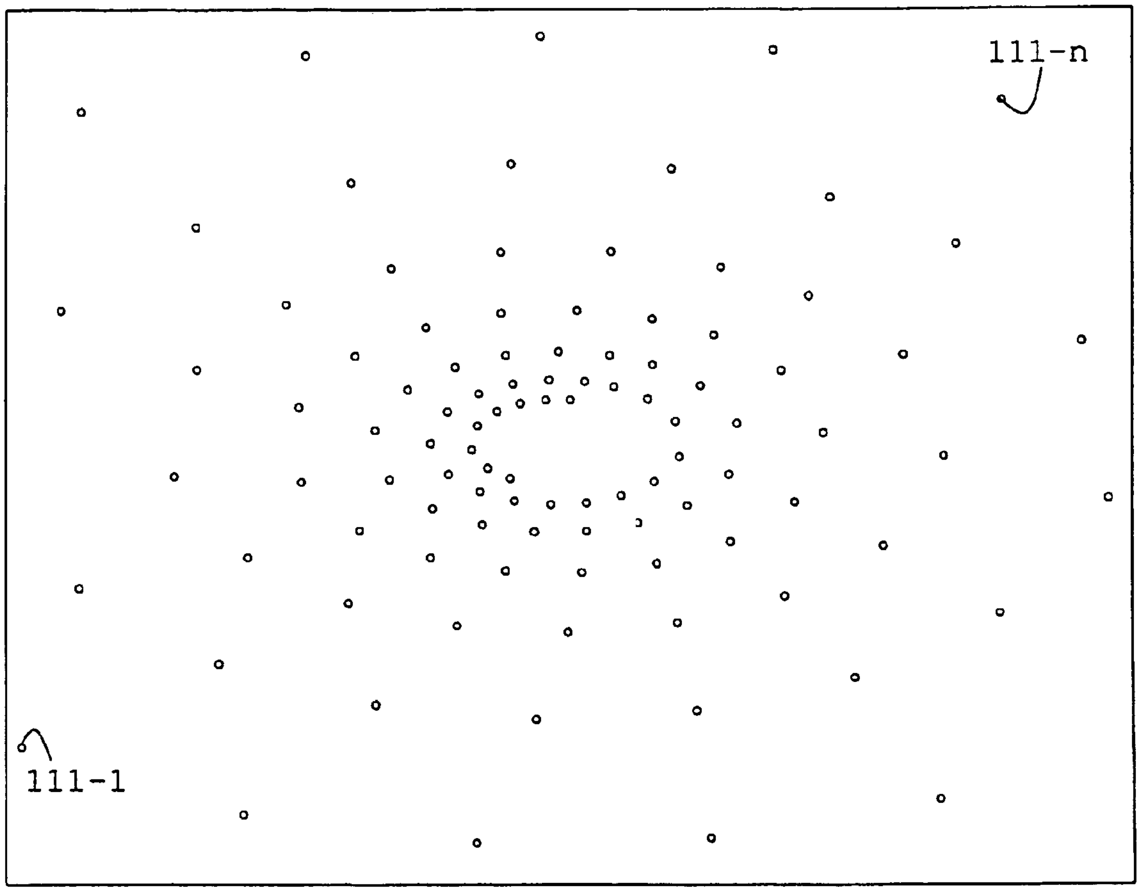
FIG. 10 shows a elliptical array layout of an array in accordance with a further example of the invention.

This can be implemented in an ordered array by using elliptical rings, as illustrated in FIG. 10. Placing transducers around an ellipse with equal chord distances is non-trivial mathematically, but can be accomplished numerically using known algorithms, such as the binary chop algorithm.

In the example illustrated by FIG. 10, transducers 111-1 to 111-n are shown. The horizontal Beta as referred to above is greater than the vertical one. The maximum permissible transducer spacing limit is just met around each ellipse and between the ellipses on the horizontal axis. However, the spacing between the ellipses is closer than necessary to meet this limit at all other angles. Hence, the design uses more transducers than would be necessary using a non-ordered layout with the same parameters. It may, nevertheless, be the preferred solution, due to reduced DSP requirements. This approach can be further generalised to other shaped 'rings', such as rectangles and hexagons with correspondingly shape windows.

Figure 11:
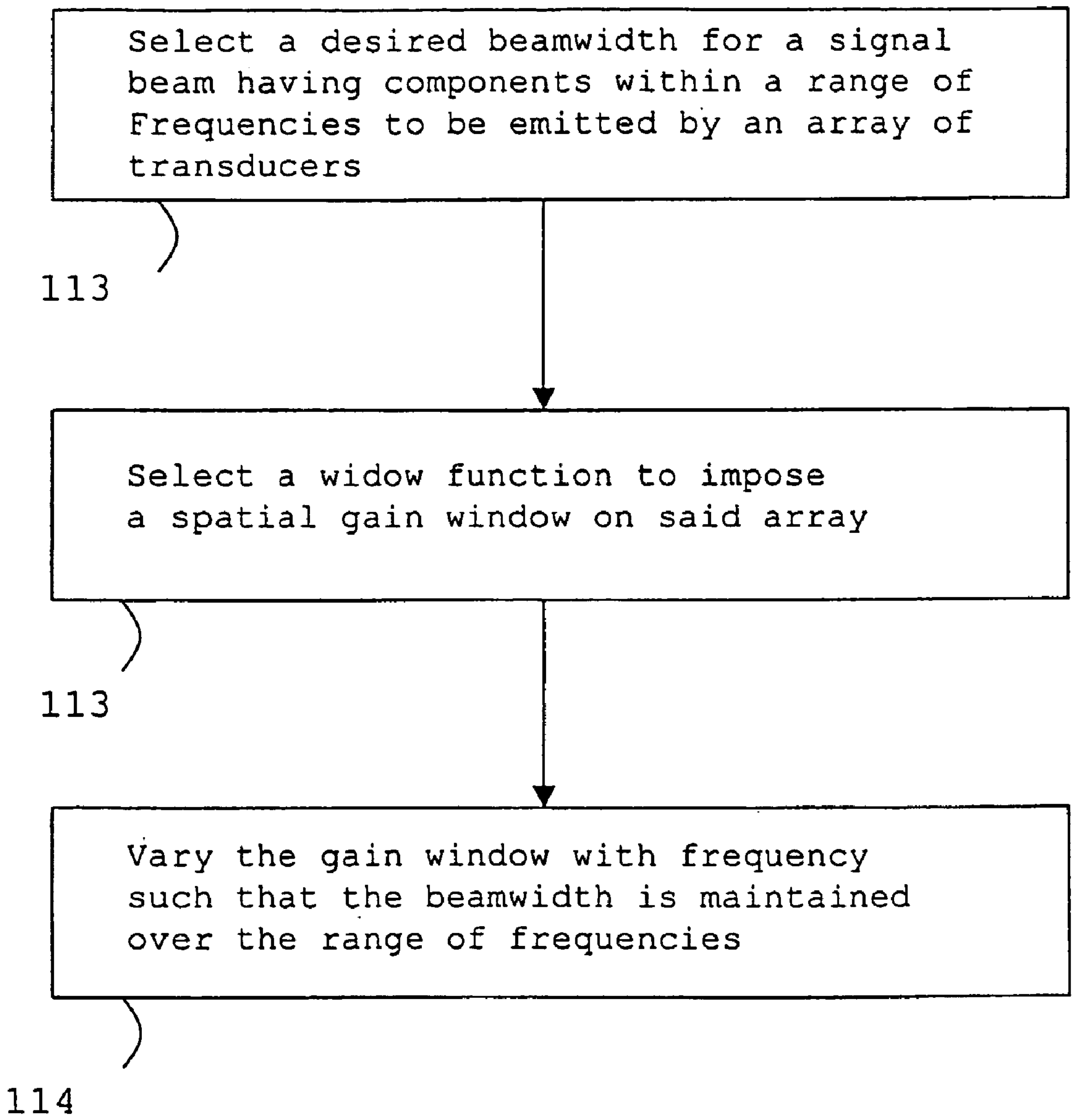
FIG. 11 is a flow chart illustrating steps of a method in accordance with the invention.

In FIG. 11, three steps 112, 113 and 114 are shown that illustrate the sequence of operational steps in accordance with an example of the invention. After choosing a desired beamwidth or a plurality of beamwidths, a window function is selected to control the emission characteristics, i.e, the effective emission area in accordance to the formulae [1], [2-2], [3-2] or other similar functions. Then, filters are designed and programmed to impose the window function onto the outputs of the transducers of the array. In operation the filters ensure that the emission is correctly widened or narrowed to ensure a constant beamwidths or constant beamwidths over the range of frequencies present in the signal to be emitted.

The above steps can be applied to transducers arrays of any layout. However, the layout may be optimized in accordance with further steps described hereinabove.

The above-described methods for designing an array layout based on a window function produce an array that, when used with the corresponding filters, just meet the required condition for Alpha across the range of frequencies, thus avoiding spatial aliasing. When using smaller windows that decrease the effective emission area below its optimal size, beams with wider beamwidth are generated. As stated above, this effect when properly incorporated into the digital signal processing architecture can be used to control the beamwidth on a channel-by-channel basis. Thus, the window function used for the array layout determines a lower limit for the beamwidth, as attempting to generate a narrower beam will lead to spatial aliasing.

The above refers to a beam at a given direction, more specifically to a direction perpendicular to the array. This is the direction of minimum beamwidth for a given array and the beams in other directions are broader. However, the methods presented above can also be used to maintain a constant beamwidth for beams in different directions by reducing the effective emission areas the perpendicular direction, the beamwidth can be held constant at a value that is sub-optimal in perpendicular direction but offers a constant value over most of the desired directions.

The invention claimed is:

1. An array of transducers for providing sound beams in air, said array comprising a plurality of electro-acoustic transducers being positioned within an outer array boundary;

a digital signal path between an input and said transducers for broadband audio signals with signal components in a range of audible frequencies; and one or more digital signal modifiers located within the signal path between said input and said transducers and capable of controlling outputs of said transducers, said one or more digital signal modifiers being adapted to confine outputs generated in response to said signal components to a subset of said transducers positioned within a subarray of said array having an outer subarray boundary lying within said outer array boundary, wherein said outer subarray boundary is widened quasi-continuously with decreasing frequency of said signal components.

2. The array of claim 1 wherein the one or more digital signal modifiers are adapted to gradually reduce the output of transducers positioned within a transitional zone of the subarray from full output to effectively zero output.

3. The array of claim 2, wherein the one or more digital signal modifiers are adapted to reduce the output of at least one transducer positioned within the transitional zone of the subarray to an amplitude level having a value below full amplitude level and effectively zero amplitude level.

4. The array of claim 1, wherein the one or more digital signal modifiers are adapted to widen the outer subarray boundary towards the outer array boundary to effectively maintain a beamwidth at a pre-selected and constant or near-constant value over the range of frequencies.

5. The array of claim 1, having digital processors adapted to arrange the signal into two or more channels, said channels having different travel lengths to a given location, wherein the one or more digital signal modifiers are adapted to maintain a different beamwidth for each of said two or more channels.

6. The array of claim 1, wherein the digital signal modifier is a finite digital filter.

7. The array of claim 1, comprising further digital signal processors to steer one or more beams of said signal into predetermined directions.

8. An array of transducers for providing sound beams in air, said array comprising a plurality of electro-acoustic transducers being positioned within an outer array boundary;

a digital signal path between an input and said transducers for broadband audio signals with signal components in a range of audible frequencies; and one or more digital signal modifiers located within the signal path between said input and said transducers and capable of controlling outputs of said transducers, said one or more digital signal modifiers being adapted to impose a frequency dependent spatial gain window onto the array of transducers.

9. The array of claim 8, wherein the width of the spatial gain window is a function of the frequency of the signal components.

10. The array of claim 8, wherein the window function has a tapered edge at which the gain is gradually reduced with increasing window radius.

11. The array of claim 8, wherein the window function is independent of frequency for all frequencies above a higher threshold frequency within the range of frequencies.

12. The array of claim 8, wherein the window function is independent of frequency for all frequencies below a lower threshold frequency within the range of frequencies.

13. The array of claim 8, wherein one or more different window functions are imposed for all frequencies below a lower threshold frequency within the range of frequencies.

14. An array of transducers for creating a sound wavefield in air, said array comprising a plurality of electro-acoustic transducers emitting acoustic wave signals and being positioned within an outer array boundary; and a digital signal path between an input and said transducers for broadband audio signals including signals within at least one range of audible frequencies, wherein the spacing between transducers is non-uniform within at least a subarray of said array.

15. The array of claim 14, wherein the average distance between adjacent transducers increases with increasing distance of said transducers from a centre of the array.

16. The array of claim 14, wherein transducers of a first size are positioned in a central subarray of the array and transducers of a second larger size are positioned outside said central subarray.

17. The array of claim 14, wherein a group of transducers are connected to the same one or more digital signal modifiers.

18. An array of transducers for providing sound beams in air, said array comprising a plurality of electro-acoustic transducers being positioned within an outer array boundary;

a digital signal path between an input and said transducers for broadband audio signals with signal components in a range of audible frequencies; and one or more digital signal modifiers located within the signal path between said input and said transducers and capable of controlling outputs of said transducers, said one or more digital signal modifiers being adapted to confine outputs generated in response to said signal components to a subset of said transducers positioned within a subarray of said array having an outer subarray boundary lying within said outer array boundary, wherein said outer subarray boundary is widened quasi-continuously with decreasing frequency of said signal components and wherein the spacing between transducers is non-uniform within at least said subarray.

19. A method of operating an array of electro-acoustic transducers to provide sound beams in air, said method comprising the steps of controlling the outputs of said transducer such that outputs generated in response to audio signal components having a range of audible frequencies are confined to a subset of said transducers positioned within a subarray of said array having an outer subarray boundary lying within said outer array boundary and widening said outer subarray boundary quasi-continuously with decreasing frequency of said signal components.

20. The method of claim 19 comprising the step of using a frequency-dependent spatial gain window function to confine the outputs.

21. The method of claim 19, comprising the step of widening the outer subarray boundaries such that a constant or near-constant beamwidth over the range of frequencies is maintained.

22. Sound system to reproduce in air a multi-channel surround sound signal including at least one rear channel, said system including an array of transducers comprising a plurality of electro-acoustic transducers being positioned within an outer array boundary;

a digital signal path between an input and said transducers for broadband audio signals with signal components in a range of audible frequencies; and one or more digital signal modifiers located within the signal path between said input and said transducers and capable of controlling outputs of said transducers, said one or more digital signal modifiers being adapted to confine outputs generated in response to said signal components to a subset of said transducers positioned within a subarray of said array having an outer subarray boundary lying within said outer array boundary, wherein said outer subarray boundary is widened quasi-continuously with decreasing frequency of said signal components.

23. The sound system of claim 22, wherein the one or more digital signal modifiers are adapted to widen the outer subarray boundary towards the outer array boundary to effectively maintain a beamwidth at a pre-selected and constant or near-constant value over the range of frequencies.

24. The sound system of claim 22, having digital processors adapted to arrange the signal into two or more channels, including the at least one rear channel, said channels having different travel lengths to a given location, wherein the one or more digital signal modifiers are adapted to maintain a different beamwidth for each of said two or more channels.

25. The sound system of claim 22, wherein an average distance between adjacent transducers increases with increasing distance of said transducers from a centre of the array.

26. The sound system of claim 22, wherein the one or more digital signal modifiers is adapted to impose a frequency dependent spatial gain window onto the array of transducers.

27. The sound system of claim 22, having digital processors adapted to arrange the signal into two or more channels, including the at least one rear channel, said channels having different travel lengths to a given location, wherein the one or more digital signal modifiers are adapted to maintain a different beamwidth for each of said two or more channels and to impose a frequency dependent spatial gain window onto the array of transducers and wherein an average distance between adjacent transducers increases with increasing distance of said transducers from a centre of the array.

28. The array of claim 1, wherein the array is a two-dimensional array.

* * * * *